United States Patent [19]

Klein et al.

[11] Patent Number: 4,535,065
[45] Date of Patent: Aug. 13, 1985

[54] METHOD FOR REGENERATION OF MOIST POWDER ADSORPTION AGENTS

[75] Inventors: Jürgen Klein; Peter Schulz, both of Essen, Fed. Rep. of Germany

[73] Assignee: Bergwerksverband GmbH, Essen, Fed. Rep. of Germany

[21] Appl. No.: 421,111

[22] Filed: Sep. 20, 1982

[30] Foreign Application Priority Data

Oct. 10, 1981 [DE] Fed. Rep. of Germany ....... 3139078

[51] Int. Cl.³ .................. B01J 20/34; C01B 31/10; C01B 31/08; C10J 3/54
[52] U.S. Cl. .................. 502/21; 34/9; 34/57 A; 48/197 A; 201/12; 201/20; 201/25; 201/31; 210/771; 432/15; 502/34; 502/39; 502/40
[58] Field of Search ........ 502/34, 39, 40, 41, 502/21; 48/197 A; 34/9, 57 A; 201/12, 20, 25, 27, 31; 432/15; 210/771

[56] References Cited

U.S. PATENT DOCUMENTS

| | | | |
|---|---|---|---|
| 3,559,296 | 2/1971 | Dratwa et al. | 34/9 |
| 3,852,216 | 12/1974 | Ninomiya et al. | 201/20 |
| 3,887,461 | 6/1975 | Nickerson et al. | 201/25 |
| 3,904,549 | 9/1975 | Barton et al. | 502/39 |
| 4,384,923 | 5/1983 | Hillekamp | 201/25 |
| 4,398,476 | 8/1983 | Suzuki et al. | 201/27 |

FOREIGN PATENT DOCUMENTS 52-5697 1/1977 Japan .................. 502/56

Primary Examiner—P. E. Konopka
Attorney, Agent, or Firm—Michael J. Striker

[57] ABSTRACT

In a method for regeneration of moist powder adsorption agent, the moist-charged adsorption agent is first fed into the lower area of a fluidized bed which is provided with an aeration and heat-carrying material; the agent then is fed upwardly through the heat-carrying material while being simultaneously dried, and then the agent is withdrawn together with the vortex gas from the fluidized bed. The agent is separated from the vortex gas in a successively switched separator, and is then fed to a further fluidized bed which is provided with a further aeration and heat-carrying material. The agent is fed in that further bed upwardly through the further heat-carrying material and is simultaneously regenerated. The agent is then discharged together with the further vortex gas from the further fluidized bed. The vortex gases which are withdrawn can be reused as mixing gases during the vortex gas generation. The adsorption agent can be mixed with a sludge, for example, from a sewage treatment plant, which, if necessary, is gasified together with the substances of the adsorption agents in the regeneration step.

4 Claims, 2 Drawing Figures

METHOD FOR REGENERATION OF MOIST POWDER ADSORPTION AGENTS

BACKGROUND OF THE INVENTION

The invention relates to a method for regeneration of moist powder adsorption agents.

Powder adsorption agents have particle sizes of substantially less than 1 mm in diameter, and mostly less than 100 μm in diameter; thereby, the agents are predominantly activated carbon, but can also be different commerical adsorption agents. Such adsorption agents are used, for example, in sewage treatment plants and preferably in so-called activated sludge basins, so as to enhance chemical processes occuring therein; but they also can be used in adsorption processes in an exclusively liquid phase. If necessary, the aforementioned adsorption agents may have a catalytic effect. In any case, such fine granulated adsorption agents are relatively expensive, so that efforts have been made to regenerate them for a reuse.

SUMMARY OF THE INVENTION

Accordingly, it is an object of the invention to provide a method of the aforementioned type, which assures a possible complete regeneration of the adsorption agent with a very low energy consumption; in particular, this is obtained in sludges from sewage treatment plants which are admixed with activated carbon.

As the most common regeneration step, a reactivation can be used. In such a reactivation step similarly to other regeneration steps sand, ash or similar inert materials can be used as aeration and heat carrying materials. The vortex gas used in both treatment steps, drying and regeneration step, is mostly free of oxidation agents and must meet the requirements of drying and regeneration in its temperature and composition in a known manner.

Surprisingly, it was found that by means of the inventive method approximately the same activity of the adsorption agent can be obtained with a lower energy requirement, as compared to a single step method.

Due to the inventive method, it is also possible, to admix the vortex gases withdrawn from the treatment in the fluidized bed, at least partially to the fresh vortex gases. This is possible, in particular, because lower temperatures are required by the vortex gas in the drying step than those required in the regeneration step.

In particular, when the moist-charged adsorption agent is admixed with a sludge, for example, in so-called activated sludge basins of sewage treatment plants, it is advantageous, to dry the adsorption agent together with the sludge. With relative inert sludge it is recommended, in accordance with the invention, to separate the dried sludge mass from the dried adsorption agent, before it enters the regeneration steps, by means of known methods, like air separation or the like; this is possible when the size of dried sludge particles is generally greater than 1 mm and thereby differentiates from the particle size of the adsorption agent. Thereby, a relative reduction of the regeneration step and a reduction of the energy requirement are obtained. As far as sludges are concerned, the dry substance of which can be gasified, it is recommended, in accordance with the invention, to transfer the total solid material from the drying process into the separator process and to at least partially gasify the dried sludge. Thereby, a separation of the adsorption agent is eliminated. Surprisingly, it had been found that the aforementioned gasification or partial gasification of the dried sludge only inconsequentially reduces the activity of the adsorption agent and that the non-gasified solid material residues from the sludge correspond in their particle size substantially to that of the adsorption agent.

In addition, it was found that it is particularly advantageous when the substances which are obtained from the adsorption agents in the regeneration step are partially gasified, in accordance with the invention; thereby an effect similar to that of the gasification of dried sludge is obtained. The aforementioned measure can also be performed in combination with the sludge gasification.

The invention can be operated successively, in particular when activated carbon is used as the adsorption agent; thereby the regeneration step would be, above all, the activated carbon activation.

When using the inventive method with powder activated carbon, for example, in the activated sludges of sewage treatment plants, it has been shown that the inventive regeneration does not only reactivate the activated carbon powder, but also the non-gasified component of the sludge, the so-called biomass, which is converted into activated carbon, so that with a single circulation the less of activated carbon powder remains clearly below 10% by volume. The capacity of a sewage treatment plant is increased by such an activated carbon powder. The ratios between activated carbon and biomass can be in a range weight between 1:20 to 1:2 and below, for example. By predewatering before the drying step, solid particles of usually between 5 and 35% are obtained.

Among others, sand is used as the aeration and heat-carrying material. Such a material has a more or less uniform grain size distribution, whereby the selection of grain sizes is defined by the known criteria for fluidized beds. Thereby, with respect to the median grain size diameters of the bulk materials care has to be taken than the vortex gas velocity is so dimensioned with respect to these values that the vortex gas is able to feed the sludge upwardly through the fluidized bed during drying and to discharge it pneumatically from the fluidized bed furnace. Preferably, quartz sand with a grain size of 1–2 mm is used; thereby, better results are obtained the tighter the grain spectrum is, and it is recommended to filter the material before using. In addition, a chemical neutrality of the bulk materials with respect to the material to be dried and the vortex gas atmosphere is desirable.

The bulk material enhances a disperse distribution of the material to be dried and therefore prevents from the start the generation of undesirable agglomerations. In accordance with the invention, the moist-charged adsorption agent is fed in the lower area of the fluidized bed, whereby and feeding stations are preferably somewhat higher than the introduction station for the vortex gas (flow bottom), since it had been shown that with this measure a more uniform sludge distribution is obtained over the cross-sectional area of the fluidized bed. The feeding of the sludge through the vortex of the heat-carrying material with a simultaneous drying of the sludge should not occur too fast, so that a thorough heat transfer is possible between the vortex gas and the goods to be treated with the bulk material, so that a desired drying and regeneration degree can be realized. The discharging of the dried or regenerated materials together with the vortex gas from above the fluidized beds can be performed in various ways, whereby it is preferred that the discharging vortex gas draws the particles in question along. This gas/solid material mass flow is separated into gas and solid material in a successively switched solid separator; for this purpose a known cyclone will suffice.

The heights which are reached by the fluidized beds depend, independently from the size of the admitted flow face, from the maximum desired treatment intensity. Thereby, when using sand as the bulk material, fluidized beds of 500 to 800 mm are used, for example.

The charging of the goods to be treated is performed by a suitable feeding member, preferably from a storage bunker.

As already mentioned, at least partially admixing of discharged vortex gas to the fresh vortex gases is selected always in such a manner that the heat losses of the vortex gases, which leave the fluidized bed, remain limited as much as possible. The temperatures of the vortex gas (mixture), which enters the drying process, are usually in the range of between 500° and 800° C., while for the regeneration process the temperatures between 800° and 1,200° C., are required. The gas to be admixed can be added alternatively or cummulatively at different locations of hot combustion gases which are used as vortex gases, for example, in the area of the burner, so as to obtain a required exhaust gas cooling, if necessary for protecting the material. The admixing can also be performed in the range of the fluidized bed furnaces, preferably in a mixing chamber of such a furnace. In addition it is recommended to preheat the required combustion air for producing combustion exhaust gases and thereby to use a part of the noticable heat of the vortex gases which are discharged from the fluidized beds.

In view of the inventive device for performing the method in question, it is recommended to use a fluidized bed furnace in which the ratio of the length of the furnace to its width is equal to or greater than 4. Thereby a good use of the flow face with respect to the heat energy is obtained and also with respect to the material distribution; thereby, it was surprising that in the use of a plurality of different charge stations these stations have no negative effect on each other.

In accordance with a further embodiment of the invention it has been shown to be advantageous to provide charge chutes at the side of the fluidized bed. They are preferably designed in such a way that they eliminate a localized charging of the materials, which can be realized, for example, by means of a tube which in the flow direction of the vortex gas has an increased bevel, thus providing a larger discharge face at its end. Thereby, the introduction speed of the goods into the fluidized bed furnaces is reduced and a face distribution is obtained. In particular, exchangeable chutes are preferred. The height of the charge stations above the flow bottoms are, in accordance with a further embodiment of the invention, about 1:20 to 1:50 of the height of the fluidized beds. In the already aforedescribed fluidized beds, a height of about 100 mm would be particularly favorable, higher disposed charge stations reduce the dwell time and the treatment intensity of the goods in the fluidized bed furnace, while lower heights may cause baking and crusting of the flow bottom; in the latter case the dispersing effect of the aeration and heat-carrying materials would be reduced.

It has been shown that in accordance with the invention a bottom of the furnace designed as a gate is particular recommendable, in contrast to the ones used in the state of the art. The hitherto used systems of a gas deflection, for example, by means of bells above the gas discharge locations are insofar disadvantageous in that they prevent the throughflow of solid particles which are still present in the vortex gas. This is eliminated by a grate, preferably a grate rod bottom. Thereby, the separation of solid particles from the discharge vortex gases does not have to be one hundred percent, although it is undesirable to move too many solid particles in the circulation through the installation. On the other hand, surprisingly, it was found that there was no vortex material flow through the flow bottom, in particular, when the bottom was a grate rod bottom. Finally the invention has shown to be particularly advantageous with respect to the energy and the device when a mixing chamber is provided below the flow bottom, at least in the fluidized bed furnace for the drying step which results in an homogenizing of the vortex gases and eliminates an additional device part, namely a separate gas mixing chamber switched in front of the fluidized bed furnace; furthermore, the vortex gas for the further fluidized bed furnace (regeneration step) can be branched off simultaneously from the gas mixing chamber.

Further objects, features, advantages and application possibilities of the subject invention can be seen from the following description of an exemplified embodiment in conjunction with the attached drawing. Thereby, all described and/or illustrated features in themselves or in any given logical combination form the subject matter of the subject invention.

DETAILED DESCRIPTION OF THE PREFERRED EMBODIMENTS

Figure 1:
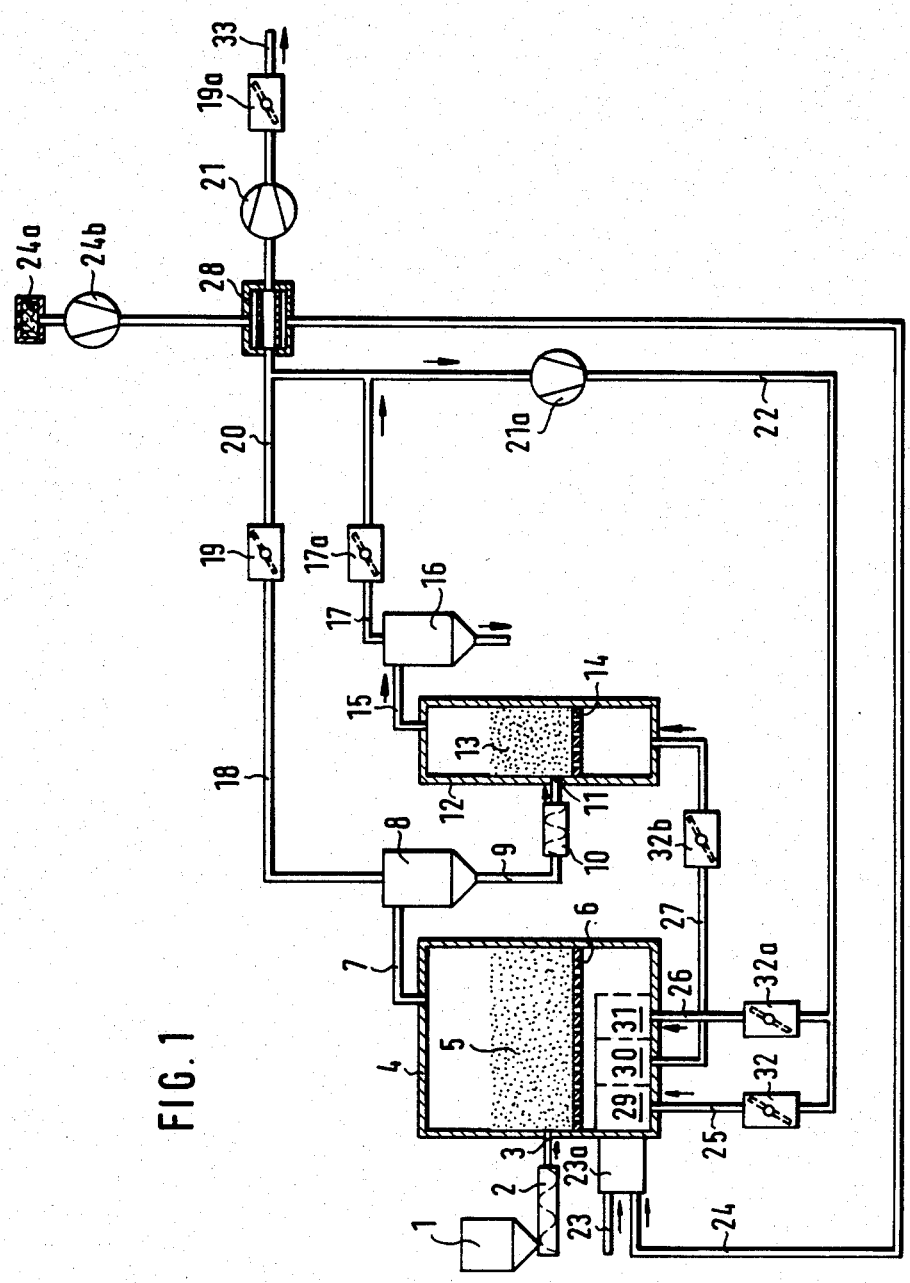
FIG. 1 is a schematic view of a system for performing the inventive method.

FIG. 1 shows a storage bunker 1 for the moist adsorption agent which, for example, can be mixed with a sewage sludge from a sewage treatment plant. The material to be treated is fed through a suitable known dosaging device 2 into the fluidized bed furnace 4 by means of one or a plurality of charge stations 3. This fluidized bed furnace is designed substantially as a rectangular fluid bed trough with a length to width ratio of at least 4:1, wherein a 600–700 mm high fluid bed 5 is operated, consisting of heat-carrying solids, sand in this case. Therein, the material is distributed for treatment and is fed upwardly through the vortexing sand while being dried at the same time. The charge stations 3 are preferably disposed about 100 mm above a bottom 6 which is charged from below with vortex gas; typically four and more charge stations are provided in uniform distribution over the longitudinal side of the fluidized bed furnace 5, for example.

After drying in the sand fluidized bed, the material to be treated together with the vortex gas is discharged from the fluidized bed and is fed through line 7 into a solid material separator 8 wherein the solid material is substantially separated from the vortex gas flow. The solid material is fed through line 9 into a dosaging device 10 which feeds it through one or more charge stations 11 into a further fluidized bed furnace 12. In FIG. 1, only one each charge station 3 and 11 can be seen, since it is a vertical section through the two fluidized bed furnaces. The further fluidized bed furnace 12 can be round or cornered; therein a further 600 to 700 mm high fluidized bed 13 is operated (for example, sand), whereby the charge stations 11 are disposed about 100 mm above the bottom 14 which is charged with vortex gas from below.

The adsorption agent is regenerated in the further fluidized bed furnace 12 by a vortex gas having a suitable temperature, i.e., in the case of a powder activated carbon as the adsorption agent, a water-gas reaction occurs free of oxygen and in the case of an admixture with the sludge of a sewage treatment plant (biomass) the latter will be totally or partially gasified. The charge substances which are obtained from the activated carbon can also be gasified in this case.

However, as already mentioned, the aforementioned biomass can be separated from the adsorption agent between the drying step and the regeneration step, either in front of or behind the solid material separator 8, which is not shown in detail in FIG. 1. During the regeneration, the adsorption agent is fed upwardly through the fluidized bed 13 and fed through line 15 into a solid material separator 16 together with the vortex gas; the separated solid material corresponds in its quality and its characteristics almost to the original, powder adsorption agent, before its charging. The substantially free of solid particles gases are fed from the solid material separator 16 through line 17 and through a pressure control 17a back into the process in which they are reused with a part of the gases coming from the solid material separator 8 through line 18, a pressure control 19 and further through line 20 as a mixture for the adjustment of the required vortex gas temperatures and quantities. They are fed through a vacuum blower 21a and through line 22 back into the process. The remainder of the gases are fed by means of a vacuum blower 21 into a heat exchanger 28 for pre-heating combustion air and are fed to the atmosphere through a pressure control 19a and through line 33. For providing the vortex gas, a liquid, gas or solid combustion fuel is fed through a line 23 to combustion chamber 23a, wherein it reacts with the preheated combustion air from line 24; for this purpose, the air is usually at first fed through a filter 24a and a blower 24b, as well as a heat exchanger 28.

Figure 2:
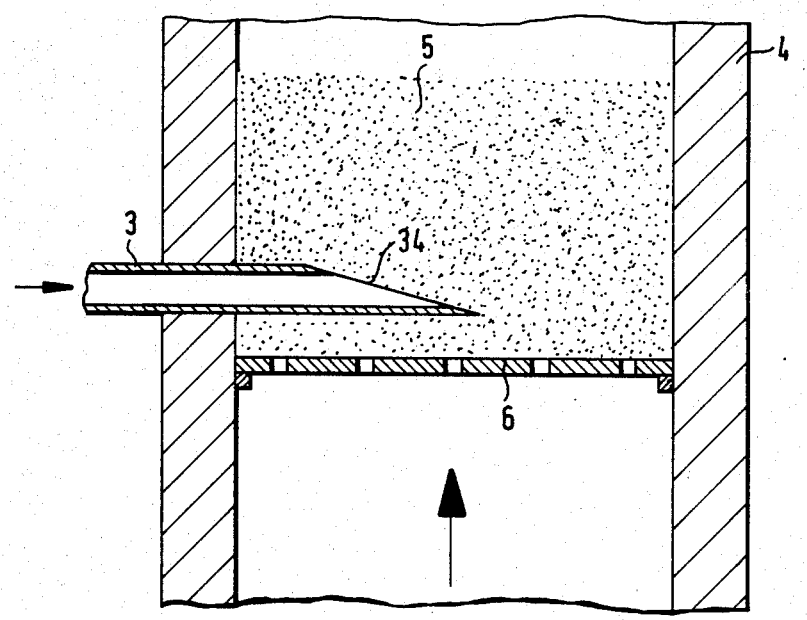
FIG. 2 is a schematic view of a charge station, partially in a section.

Mixing chambers 29, 30, 31 are provided below the flow bottom 6 of the fluidized bed furnace 4. The hot combustion gas is mixed in the mixing chamber 29 with returned vortex gas which branches off from line 22 and which is fed through the pressure control 32 and line 25 into mixing chamber 29. From a mixing chamber 30 which is switched subsequent to mixing chamber 29 a partial flow of the hot gases can be branched off through line 27, so that it is fed as a vortex gas through the pressure control 32b into the fluidized bed furnace 12. The other partial flow from mixing chamber 30 is fed to the mixing chamber 31 wherein it is further cooled by means of the remainder of the gases from line 22 and is then fed as a vortex gas through the bottom 6 into the fluidized bed 5; for this purpose, a corresponding gas flow is fed from line 22 through pressure control 32a and line 26 and into the mixing chamber 31. From FIG. 2 one can see the design of the charge station in conjunction with the example of fluidized bed furnace 4. In this case the charge station 3 is designed as a tube-like chute; it extends with its free upwardly-bevelled end 34 into the fluidized bed 5. Such charge chutes are preferably disposed in a staggered arrangement transverse to the drawing plane, whereby the illustrated side view in FIG. 2 represents the small side of the fluidized bed furnace 4.

EXAMPLE

For the inventive method, a fluidized bed furnace designed as a trough was used for the drying step with a base surface area of 0.16 m$^2$ and a side ratio 4:1. The fluidized bed furnace was filled with 500 mm of sand (rest position) having a median grain size or a diameter of 1 to 2 mm. A mixture of stochiometric burned natural gas and returned exhaust gas at a temperature 670° C. and in a flow quantity of about 420 m$_n^3$/h was used as the vortex gas. The material to be treated was an activated carbon admixed at equal parts by weight with sludge. 90% of this powder activated carbon has a grain size <40 μm and a median specific weight of the material about 400 g/l. About 10 g/m$^3$ of sewage water of this activated carbon is fed into the sludge basin of a biological sewage treatment plant.

The total solid material was present as a watery sludge with a dry substance content of 25%; of this sludge 100 l/h were fed to the fluidized bed furnace, continuously.

The vortex gas discharged from the fluidized bed and the dried solid material had a temperature 180° C. at a height 1,000 mm above the flow bottom.

About 93% of the solid material had been separated from the gas flow in a cyclone which was switched subsequent to the fluidized bed furnace and had the diameter 500 mm and the total height 1400 mm; the solid material was then fed to the regeneration step by means of a dosaging device. The dosaging device consisted of a dosaging part and a feeding worm, whereby the first was mounted gas-tight over the inlet trough of the feeding worm. The regeneration step consisted of a round, stationary fluidized bed furnace with a width of 200 mm and a bottom with a cross section of 0,031 m$^2$. The filling of the fluidized bed furnace again consisted of a 500 mm high sand layer (in rest position) with the same grain size as in the drying step. The vortex gas temperature below the flow bottom was 1,020° C. 25 Kg of dry substance/h were filled from the drying step into this fluidized bed furnace with the aforementioned feeding worm and regenerated. This was a reactivation, wherein the vortex gas had the following composition: N$_2$=66 Vol.-%, CO$_2$=6 Vol.-%, H$_2$O=28 Vol.-%. Under these conditions, the regenerations were performed whereby the charged substance from the activated carbon and a part of the biomass or sludge were gasified. The remaining part of the biomass was yielded as carbon and ash.

The obtained reactivated material was again reused in the same cleaning process, whereby no deterioration with respect to the adsorption capability and the service life and the characteristics with respect to new activated carbon were noted.

For a comparison fresh, never used activated carbon as well as regenerated activated carbon were converted into ash; thereby an ash content of 9, 8 was obtained with the fresh activated carbon and with the regenerated about 11%. This slight increase in the ash component is surprising in light of the comparably high component of biomass which as dried and gasified in the process, thus showing that it is possible to obtain a sufficient regeneration of powder carbon with the inventive method.

We claim:

1. A method of regeneration of moist powder activated carbon, comprising the steps of mixing a moist powder activated carbon with a sewage sludge to obtain a mixture; feeding said mixture into a first fluidized bed filled with a heat-carrying solid material; introducing hot gases into said first fluidized bed below said solid material; drying said mixture while it is fed by said hot gases upwardly in said first fluidized bed through said solid material; withdrawing the dried mixture together with the hot gases from said first fluidized bed at a region thereof above said solid material; separating the dried mixture from the hot gases in a first gas separator; separating the dried sludge from the dried activated carbon; feeding said dried activated carbon into a second fluidized bed filled with a heat-carrying solid material; introducing hot gases into said second fluidized bed below said solid material; regenerating the activated carbon in said second fluidized bed while the activated carbon is fed by the hot gases upwardly through the heat-carrying solid material in said second fluidized bed; withdrawing activated carbon together with the gases from said second fluidized bed at a region thereof above said solid material; and separating the activated carbon from the gases in a second gas separator.

2. The method as defined in claim 1, wherein said heat-carrying solid material in said first fluidized bed and said second fluidized bed is sand.

3. The method as defined in claim 1, further including the step of obtaining a portion of the gases from said first separator and mixing said portion with the gases freshly introduced into said first fluidized bed.

4. The method as defined in claim 3, wherein said sludge is obtained from a sewage treatment plant.

* * * * *